United States Patent [19]

Kettering

[11] Patent Number: 4,687,158
[45] Date of Patent: Aug. 18, 1987

[54] JUMP STRUT LANDING GEAR APPARATUS AND SYSTEM

[75] Inventor: Charles W. Kettering, Marietta, Ga.

[73] Assignee: Lockheed Corporation, Calabasas, Calif.

[21] Appl. No.: 754,837

[22] Filed: Jul. 15, 1985

[51] Int. Cl.⁴ .............................................. B64D 25/22
[52] U.S. Cl. .................................. 244/63; 244/100 R; 244/102 R
[58] Field of Search ......... 244/100 R, 102 R, 102 SS, 244/102 SL, 63, 104 FP, 169; 60/632, 415, 634

[56] References Cited

U.S. PATENT DOCUMENTS

| | | | |
|---|---|---|---|
| 1,745,081 | 1/1930 | Crumbaugh | 244/63 |
| 2,735,634 | 2/1956 | Fosness | 244/104 FP |
| 2,965,334 | 12/1960 | McCullough et al. | 244/169 |
| 2,986,005 | 5/1961 | Dudley | 60/632 |
| 3,276,330 | 10/1966 | Johnson | 60/415 |
| 4,412,419 | 11/1983 | Thomas et al. | 60/634 |
| 4,524,929 | 6/1985 | Gebhard | 244/63 |

Primary Examiner—Galen Barefoot
Attorney, Agent, or Firm—Eric R. Katz; Vangelis Economou

[57] ABSTRACT

A jump strut landing gear apparatus for providing an aircraft with a short takeoff and landing capability, utilizes incrementally fired, pyrotechnic charges to explosively generate the required compressed fluid to drive the apparatus.

5 Claims, 8 Drawing Figures

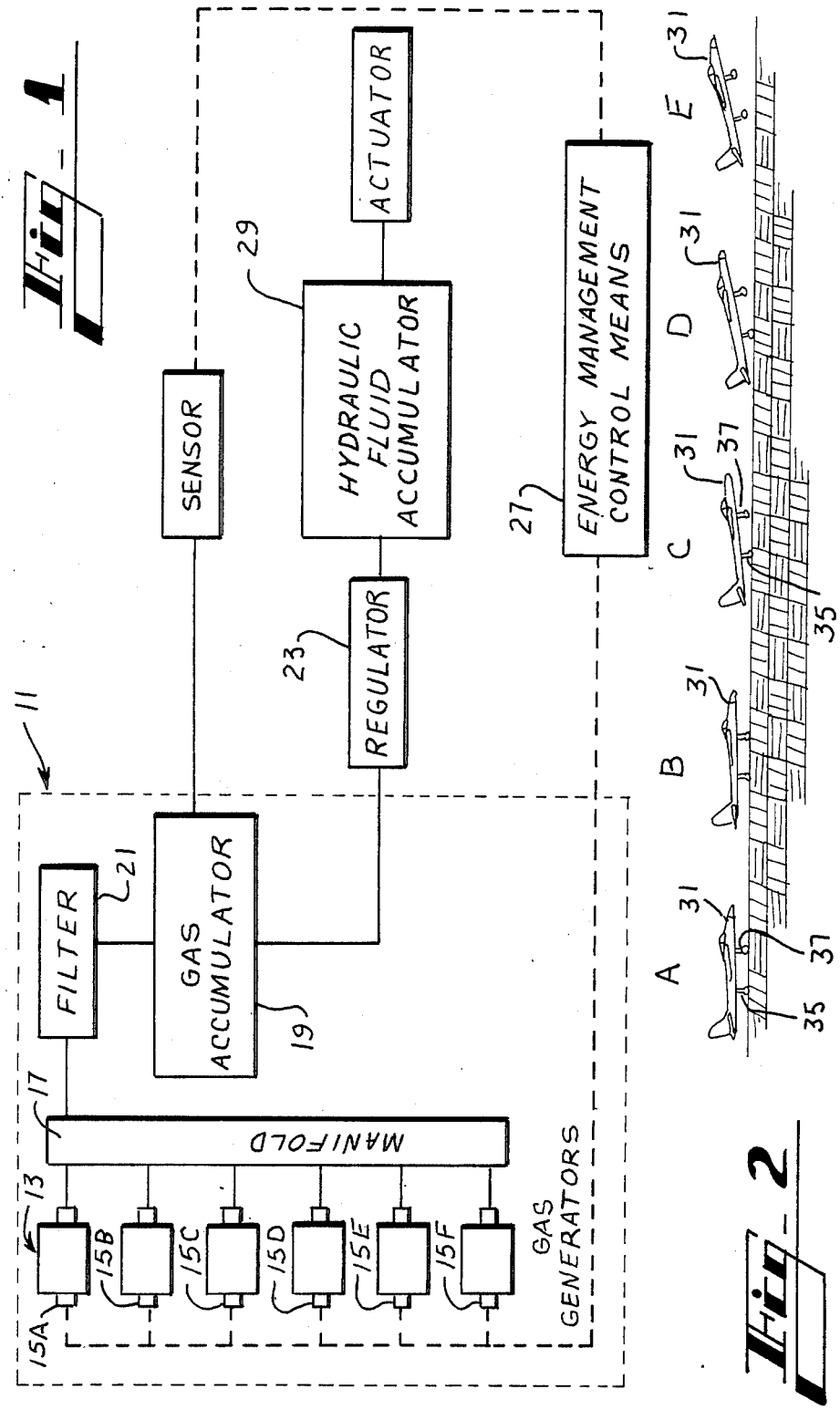

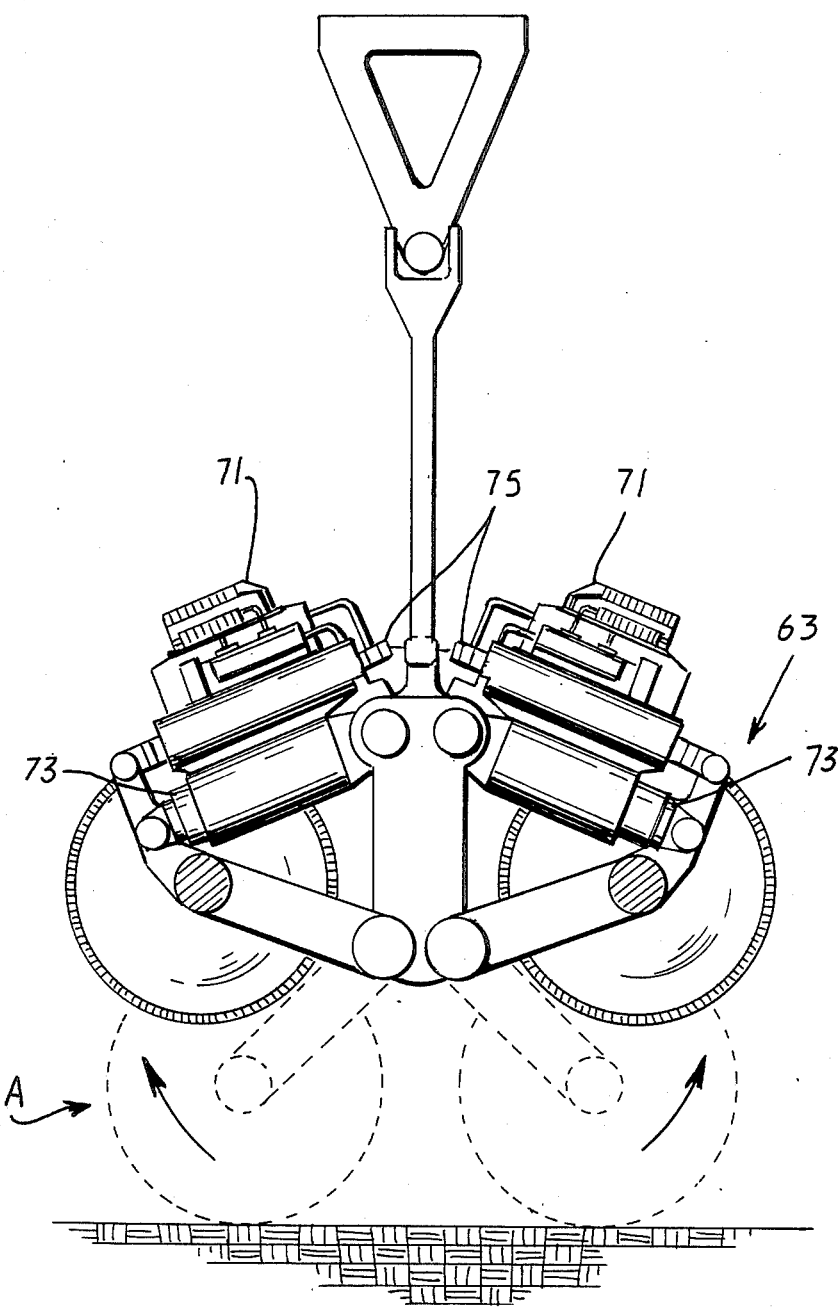
Fig_5

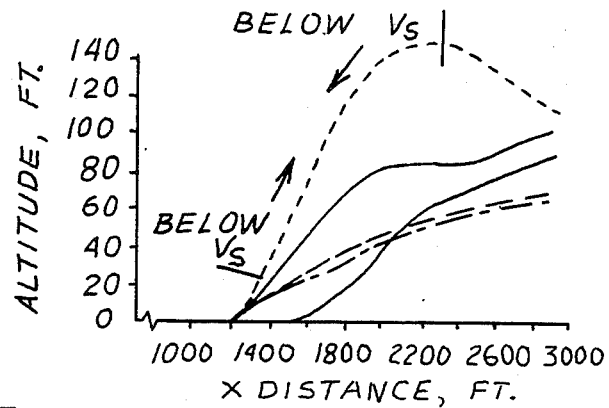
Fig_6
EFFECT OF JUMP STRUT THRUST DISTANCE
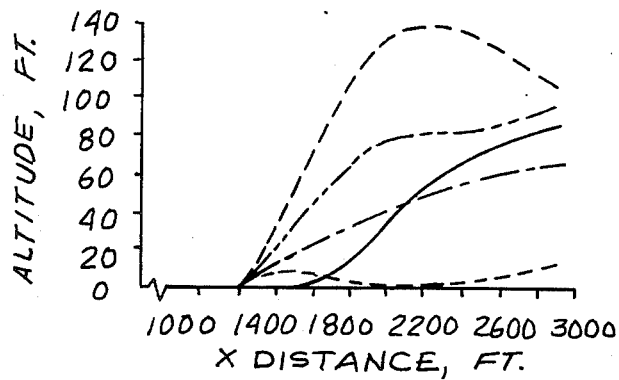
Fig_7
EFFECT OF NOSE GEAR JUMP STRUT ACTUATION FORCE
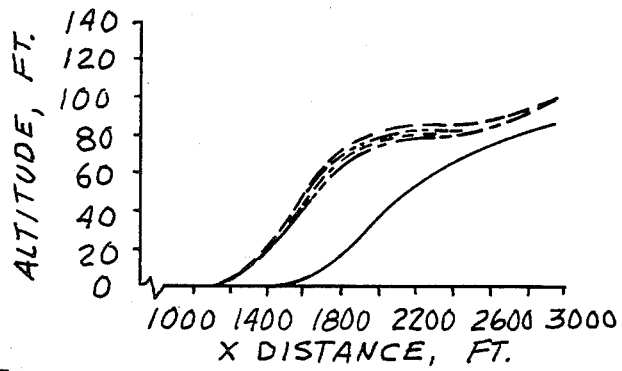
Fig_8
EFFECT OF MAIN GEAR JUMP STRUT ACTUATION FORCE

JUMP STRUT LANDING GEAR APPARATUS AND SYSTEM

TECHNICAL FIELD

The present invention generally relates to a jump strut landing gear apparatus and system for providing an aircraft with a short takeoff and landing (STOL) capability and, more particularly, to an explosively generated compressed fluid actuated jump strut landing gear apparatus and system utilizing incrementally fired, pyrotechnic charges to explosively generate the required compressed fluid to drive the system.

BACKGROUND ART

Increased emphasis has been placed on designing aircraft for STOL operation from, for example, austere airfields; however, current powered-lift STOL designs fail to optimize the aircraft configuration for both STOL and cruise performance. Because large pitching moments and engine-out yawing and rolling moments are associated with known powered-lift STOL aircraft, the conventional aircraft, configured for STOL performance, requires large control surfaces. These large control surfaces result in an increase in overall weight as well as in a drag penalty at cruise speeds. Furthermore, even with the use of large control surfaces, the airspeed needed for minimum control is relatively high compared to that which is theoretically obtainable.

Since the above-noted lower potential takeoff speed is not utilized by known STOL aircraft, heretofore, increased thrust has been employed to accelerate the aircraft to the required speed necessary to meet takeoff requirements. As a result, the engine of a STOL aircraft is often over-designed for cruise performance which results in a higher rate of fuel consumption than an engine specifically adapted for cruise operation.

Additionally, STOL aircraft takeoff speeds, and consequently distances have been controlled, to a large extent, by the inability to rotate at low speeds and by pitch limitations imposed by tail strike geometry. Thus, known powered-lift STOL designs impose drag and weight penalties on an aircraft during cruise operation in connection with a design which is useful for only a short period of time during the operation of the aircraft.

In an attempt to overcome the above-noted problems, alternative, non-aerodynamic design approaches have been proposed. One such solution is the use of an in situ "ski ramp" device positioned, during takeoff, on a runway for use with an aircraft essentially designed for cruise operation. The ramp deflects some ground run momentum upwards before the aircraft reaches flight speed, the resulting trajectory permitting continued velocity increase up to flight speed without additional ground run.

Another approach being investigated is the use of a jump strut landing gear device utilizing a pneumatically charged chamber which is mechanically latched in a compressed position under a high load until the moment of release. By sequentially releasing the nose and main landing gear latches, the compressed charge extends the landing gear strut to achieve the desired "ski jump" effect.

Traditionally, the purpose of aircraft landing gear has been to absorb energy during touchdown, facilitate ground maneuver, assist in braking the aircraft during runway operation, provide adequate taildown angle for takeoff, and assure the stable support of the aircraft while on the ground. The typical, known landing gear comprises shock absorbers, wheels, tires, brakes, as well as necessary linkages and structures.

Thus, in the past, aircraft landing gear has been designed primarily for absorption of landing impact forces with little or no consideration for STOL operation on austere landing fields having rough ground surfaces. As noted above, significant operational benefits result by providing a stored energy capability within the landing gear. However, the latched-pneumatic charged system presents some energy management problems as well as wear and sequencing considerations due to the requirement that unlatching occurs at high loads. Additionally, operating a charged system for extended periods of time results in reliability and risk concerns.

DISCLOSURE OF INVENTION

It is, therefore, an object of the present invention to provide an aircraft with a STOL system for furnishing early lift-off and short field landing capabilities.

Another object of the present invention is to provide an aircraft with a STOL system for facilitating a high pitch attitude and high clearance capability during lift-off.

Yet another object of the present invention is to provide a STOL system for an aircraft which affords substantial weight and cost savings.

Still another object of the present invention is to provide a STOL system for an aircraft which is reliable and relatively simple in operation.

The principal feature of the present invention is the provision of a totally new approach for driving a jump strut landing gear system, which heretofore, has been accomplished in the art by means of pneumatic charging and the like. In accordance with the present invention, the instant jump strut landing gear system utilizes incrementally fired, pyrotechnic charges to produce the explosively generated compressed fluid employed to drive the system.

Another important feature of the present invention is the inclusion of an energy management control means for controlling the quantity of compressed fluid explosively generated to determine the vertical acceleration imparted to the aircraft by the extension of the jump strut of the landing gear system. The energy management control means includes input means for precise configuration of the system for a specific mission profile.

Yet another important feature of the present invention is that the jump strut landing gear system is easily retrofitted to existing aircraft with a minimum of modification.

An important feature and significant advantage of the present invention is the use of a reloadable cartridge for receiving a plurality of individually ignitable pyrotechnic charges, each charge having a known quantity of available energy. This arrangement permits easy recharging of the system and eliminates the need for mechanically latching of the system in the compressed position under a high load until the moment of release.

Another advantage of the present invention is that it provides a low maintenance design which is operationally reliable.

Yet another advantage of the present invention is that it provides a low drag, lightweight system for furnishing an aircraft with STOL capabilities, the system being utilized for only a short period of time during the operation of the vehicle without affecting the performance qualities of the aircraft during cruise operation.

Still another advantage of the present invention is the reduction of control surface size for STOL operation.

In accordance with these and other objects, features, and advantages of the present invention there is provided a jump strut landing gear system for an aircraft having an undercarriage for surface support, the undercarriage having at least one landing gear assembly. The system includes a fluid generator for explosively generating a predetermined quantity of compressed fluid having a known energy; an extendable landing gear strut associated with at least one landing gear assembly, the strut being extendably driven by the explosively generated compressed fluid to impart a vertical acceleration to the aircraft. Also included is an energy management control means for controlling the quantity of compressed fluid generated to determine the vertical acceleration imparted to the aircraft.

Further in accordance with the present invention, the energy management control means control the sequence of release of the landing gear assembly of the undercarriage of the aircraft during takeoff to provide aircraft rotation and upward vectored momentum before the aircraft reaches flight speed and during landing to more precisely absorb the landing shock energy.

Also in accordance with the present invention, there is provided a jump strut landing gear apparatus for an aircraft comprising a fluid generator for generating a predetermined quantity of compressed fluid having a known energy; a fluid accumulator for accumulating the compressed fluid to a predetermined pressure; a hydraulic accumulator for receiving the compressed fluid at the predetermined pressure, an extendable landing gear strut driven by the hydraulic accumulator to impart a predetermined vertical acceleration to the aircraft; and an energy management control means for controlling the quantity of compressed fluid generated by the fluid generator to determine the vertical acceleration imparted to the aircraft by the extendable landing gear strut.

The fluid generator includes a housing adapted to be bolted onto the landing gear assembly and a reloadable cartridge for receiving a plurality of individually ignitable pyrotechnic charges for generating compressed fluid, each charge having a known quantity of available energy. Firing ignitors are provided for each pyrotechnic charge, a fluid generator manifold being included for conducting the compressed fluid generated by the charges to a plenum for collecting the generated compressed fluid. Also included is a filter for removing particulate matter from the compressed fluid.

BRIEF DESCRIPTION OF THE DRAWINGS

FIG. 1 is block diagram illustrating the fluid generator of the jump strut landing gear apparatus of the present invention;

FIGS. 2A-2E illustrate the sequence of operation of a jump strut landing gear system as applied to an aircraft having a tricycle landing gear undercarriage;

FIG. 5 is a side view, partially in section, illustrating the operation of the jump strut landing gear apparatus as illustrated by FIG. 3; and FIGS. 6-8 illustrate the effect of varying jump strut duration, nose gear actuation force and main gear actuation force.

BEST MODE FOR CARRYING OUT THE INVENTION

Figure 3:
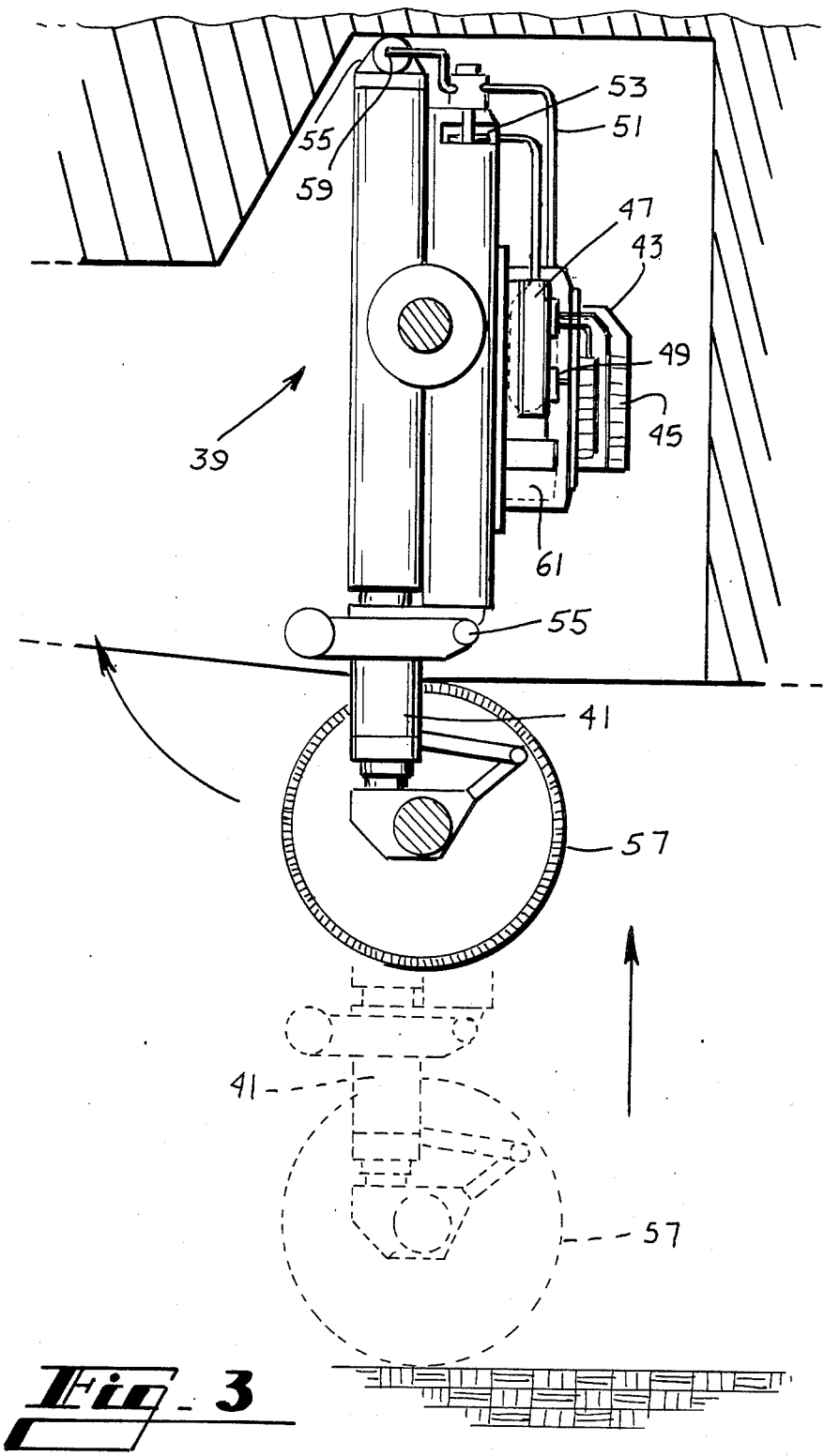
FIG. 3 is a side view, partially in section, illustrating the jump strut landing gear apparatus as applied to a nose landing gear assembly.

Substantial STOL operational benefits are reliably achieved with a minimum of weight and complexity utilizing the jump strut landing gear apparatus and system of the present invention. The apparatus and system are adapted for installation on a variety of different aircraft configurations including high thrust-to-weight ratio aircraft, such as, fighter aircraft, as well as airlifters, for example, assault cargo/special mission aircraft. As will be explained in further detail hereinafter, the apparatus and system, when not needed for STOL performance, remain dormant during conventional aircraft takeoff and landing modes, thus functioning as a conventional undercarriage.

The apparatus and system are pressurized utilizing a stored energy fluid generator for explosively generating a predetermined quantity of compressed fluid having a known energy, the compressed fluid being utilized to drive the jump strut landing gear. Referring to FIG. 1, the fluid generator, generally indicated at 11, comprises a reloadable cartridge, generally indicated at 13, for receiving a plurality of individually ignitable pyrotechnic charges for generating compressed fluid, each charge having a known quantity of available stored energy. Firing initiators, 15a-15f are provided for each individual charge, preferably, dual in line initiators. A manifold 17 conducts the explosively generated fluid from the charges to a plenum, fluid accumulator 19. A filter 21 is interposed between the manifold 17 and plenum 19 to remove particulate matter from the compressed fluid. The fluid generator 11 is contained in a housing adapted to be bolted onto a high sink rate landing gear assembly, thus permitting easy retrofit of the apparatus and system to existing aircraft configurations.

The plenum 19 collects or accumulates the explosively generated compressed fluid to a predetermined pressure, for example, 3000 psi, this being accomplished by means of, for example, a pressure regulator or sequencing/relief valve 23 or the like.

To prevent over-pressurization of plenum 19, a pressure sensor 25 is provided which senses the internal pressure of the plenum 19. Output signals from the pressure sensor 25 are provided to energy management control means 27 which controls the firing sequence of the pyrotechnic charges loaded into cartridge 13. When an over-pressurization signal is received from sensor 25, control means 27 deactivates the firing initiators 15 to prevent ignition of the charges thereby assuring against further pressurization of plenum 19. The threshold pressure for deactivation of the initiators 15 is, for example, 3500 psi.

A hydraulic fluid accumulator 29 receives the compressed fluid beginning at the predetermined pressure, the hydraulic fluid accumulator 29 being operatively associated with a hydraulic actuator 31 which in the instant invention comprises an extendable high sink rate landing gear strut.

A key feature of the present invention is the utilization of the energy management control means 27 in combination with individually ignitable, discrete pyrotechnic charges, each charge having a known quantity of available energy. The use of pyrotechnic charges, which occupy little space when dormant, permit the system to be pressurized only during the system's initiation cycle, thus eliminating the need to pressurize the system for an extended period of time as in the latched pneumatic jump strut.

Precise system sequencing and firing of the jump strut landing gear system of the present invention are provided by the control means 27 which utilizes a computer control module or microprocessor having the control law logic, peripheral sensor interfaces, and system redundancy levels required to achieve the desired reliability. The control computer microprocessor calculates the energy requirements, i.e. thrust levels to meet the desired profile and initiates the firing sequence and number of charges needed. This is achieved by adapting the computer to be manually programmed by the pilot so that the desired STOL flight profile is inputted, i.e. gross weight, field length, etc. Once programmed, the control means 27 arms the initiation circuits. Deployment of the system is automatically sequenced as required during aircraft takeoff. The control means 27 continuously monitors aircraft performance sensors including all of the relevant six-degree-of-freedom parameters including engine thrust as well as load and acceleration sensors to prevent overloading the functional systems or aircraft.

Referring to FIGS. 2A-2E, the operation of the jump strut landing gear system of the present invention is illustrated as applied to an aircraft 31, having a tricycle undercarriage assembly, generally indicated at 33. Undercarriage 33 comprises main landing gear assembly 35, and nose landing gear assembly 37, a jump strut landing gear apparatus being applied to each assembly 35 and 37 as will be more fully described hereinafter.

During the initial takeoff ground run of the aircraft, the jump strut landing gear apparatus applied to each assembly 35 and 37 are precisely actuated sequentially to provide aircraft rotation and upward vectored momentum, with a sustained takeoff thrust-to-weight ratio, before the aircraft 31 reaches flight speed. The resulting trajectory permits continued velocity increase up to flight speed without additional ground run. This effect is analogous to the ski-jump effect, only without the use of a physical ski ramp.

FIG. 3 illustrates a jump strut landing gear apparatus, generally indicated at 39, as applied to a nose landing gear assembly 41. The apparatus 39 comprises a reloadable cartridge 43 adapted to receive a plurality of individually ignitable pyrotechnic charges 45. The compressed fluid, explosively generated upon detonation, is collected by plenum 47, contained by a bolt-on housing 49, and conveyed by conduit 51 to a hydraulic fluid accumulator or primary actuation piston 53 which drives an extendable landing gear strut 55, preferably, a high-sink-rate landing gear strut. Upon actuation of the apparatus 39, strut 55 is deployed to position the landing gear assembly 41 as illustrated by ghost lines, generally indicated at 57. Sequencing/relief valve 59, fluid snubbing passages and reservoir 61 are provided to assure proper energy management of the system.

The landing gear assembly, particularly described above, is typically employed as the nose landing gear assembly of most aircraft and as the main landing gear assembly configuration for such aircraft as, for example, high performance fighter aircraft with relatively high thrust-to-weight ratios as well as relatively light-weight aircraft. For heavier aircraft, for example transports or airlifters, the landing gear assembly illustrated in FIGS. 4 and 5 is best suited as a main landing gear assembly.

Figure 4:
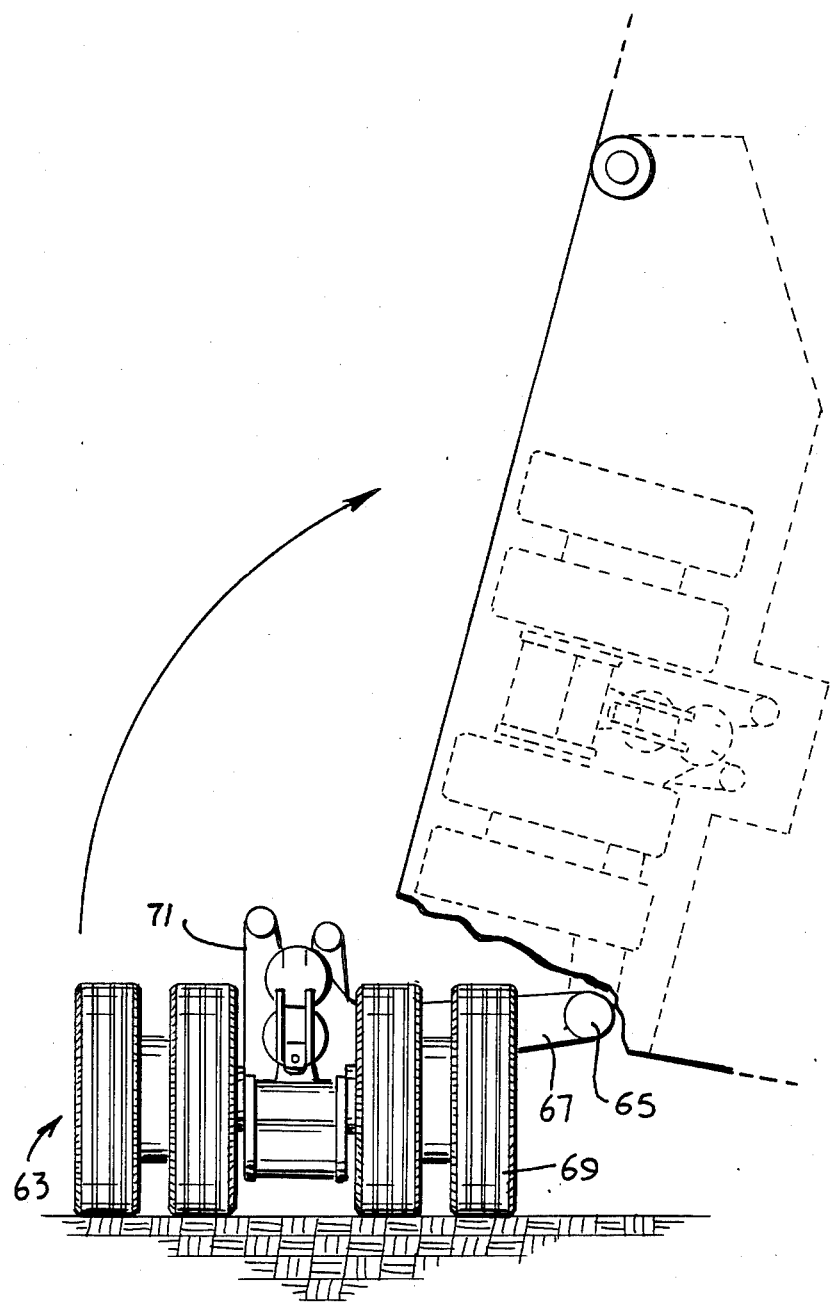
FIG. 4 is a front view of the jump strut landing gear apparatus as applied to a main landing gear assembly.

Referring to FIG. 4, a high-flotation landing gear assembly is illustrated, generally indicated at 63. The assembly 63, as noted previously, is particularly adapted for use as a main landing gear assembly and is pivotally mounted at 65 and comprises a cantilever support 67 to which a multi-wheel assembly 69, is attached. The jump strut landing gear apparatus, as applied to assembly 63, is illustrated, generally at 71, as will be more fully described with reference to FIG. 5.

As seen in FIG. 5, the assembly 63 includes a plurality of high sink rate shock absorbers 73, each of which being adapted to be driven, in the same manner described previously, by means of an individually provided jump strut landing gear apparatus 71. A gas generator-equalization plenum manifold 75 is provided for gas pressure-cross equalization between each individual jump strut landing gear apparatus 71 provided. The nominal jump excursion A, for the assembly 63, is illustrated as the difference between the unactuated position illustrated in solid lines and the extended position shown in ghost lines.

FIGS. 6-8 illustrates the effect of varying jump strut thrust duration, nose gear actuation force and main gear actuation force.

While the invention has been particularly shown and described herein, it will be understood by those of ordinary skill in the art that various changes in form and detail may be made herein without departing from the spirit and scope of the invention as defined by the appended claims.

I claim:

1. A jump strut landing gear apparatus for an aircraft comprising:
   (a) a fluid generator for generating a predetermined quantity of compressed fluid having a known energy;
   (b) a fluid accumulator for accumulating the compressed fluid to a predetermined pressure;
   (c) a hydraulic accumulator for receiving the compressed fluid at said predetermined pressure;
   (d) an extendable landing gear strut driven by said hydraulic accumulator to impart a predetermined vertical acceleration to the aircraft; and
   (e) an adjustable energy management control means for controlling the quantity of compressed fluid generated by said fluid generator to control the vertical acceleration imparted to the aircraft by said extendable landing gear strut, and including input means for manually inputting a desired acceleration quantity in accordance with the gross weight of the aircraft and desired takeoff distance, said adjustable energy management control means further being adapted to monitor aircraft performance sensors and utilizing data generated by said sensors in order to control said quantity of compressed fluid generated by said fluid generator.

2. An apparatus according to claim 1, wherein said fluid generator comprises:
   (a) a housing adapted to be bolted onto a landing gear assembly;
   (b) a reloadable cartridge for receiving a plurality of individually ignitable pyrotechnic charges for generating a predetermined quantity of compressed fluid, each charge having a known quantity of available energy;
   (c) a firing initiator of each charge;
   (d) a fluid generator manifold for conducting the compressed fluid from the charges;

(e) a fluid generator plenum for collecting generated compressed fluid from said manifold to a predetermined pressure; and (f) a filter for removing particulate matter from the compressed fluid.

3. The apparatus according to claim 2 wherein said fluid accumulator further comprises a pressure release valve for releasing the compressed fluid to a predetermined threshold pressure.

4. The apparatus according to claim 3 wherein said fluid accumulator further comprises a pressure sensor for sensing the internal pressure of said fluid accumulator and for providing over-pressurization signals to said energy management control means for deactivating said firing initiators to prevent further ignition of pyrotechnic charges thereby assuring against further pressurization of said accumulator.

5. A jump strut landing gear system for an aircraft having an undercarriage for surface support, the undercarriage having at least one landing gear assembly, said system comprising:

(a) fluid generator for explosively generating a predetermined quantity of compressed fluid having a known energy;

(b) an extendable landing gear strut associated with at least one landing gear assembly, said strut being extendably driven by said predetermined quantity of explosively generated compressed fluid to impart a vertical acceleration to the aircraft; and (c) an adjustable management control means for controlling the quantity of compressed fluid generated by said fluid generator to determine the vertical acceleration imparted to the aircraft by said extendable landing gear strut, and including input means for manually inputting a desired acceleration quantity in accordance with the gross weight of the aircraft and desired takeoff distance, said adjustable energy management control means further being adapted to monitor aircraft performance sensors and utilizing data generated by said sensors in order to control said quantity of compressed fluid generated by said fluid generator.

* * * * *